March 19, 1968  H. E. LAWSON  3,374,120
APPARATUS AND METHOD REGARDING GENERATION OF
ELECTRICAL ENERGY FROM THERMAL ENERGY
Filed Oct. 23, 1962  3 Sheets-Sheet 1

INVENTOR.
HERBERT E. LAWSON
BY
ATTORNEY

March 19, 1968  H. E. LAWSON  3,374,120
APPARATUS AND METHOD REGARDING GENERATION OF
ELECTRICAL ENERGY FROM THERMAL ENERGY
Filed Oct. 23, 1962  3 Sheets-Sheet 2

INVENTOR.
HERBERT E. LAWSON
BY
ATTORNEY

March 19, 1968     H. E. LAWSON     3,374,120
APPARATUS AND METHOD REGARDING GENERATION OF
ELECTRICAL ENERGY FROM THERMAL ENERGY
Filed Oct. 23, 1962     3 Sheets-Sheet 3

INVENTOR.
HERBERT E. LAWSON
BY
*ATTORNEY*

United States Patent Office 3,374,120
Patented Mar. 19, 1968

3,374,120
APPARATUS AND METHOD REGARDING GENERATION OF ELECTRICAL ENERGY FROM THERMAL ENERGY
Herbert E. Lawson, Glendora, Calif., assignor to Aerojet-General Corporation, Azusa, Calif., a corporation of Ohio
Continuation-in-part of application Ser. No. 833,781, Aug. 14, 1959. This application Oct. 23, 1962, Ser. No. 232,428
20 Claims. (Cl. 136—86)

This application is a continuation-in-part of application, Ser. No. 833,781, filed Aug. 14, 1959, now abandoned.

This invention relates to a new and improved galvanic battery capable of converting thermal energy into electrical energy. In a particularly useful embodiment of the invention the battery is operative in the complete absence of gravity and thus it has utility for satellite applications where it can draw thermal energy from the sun or other celestial sources and operate continuously or intermittently according to a prearranged program.

One object of the present invention is to provide a means of generating electrical energy directly from thermal energy.

It is another object of this invention to provide a battery which can be recharged merely by applying thermal energy thereto.

It is still another object of the invention to provide an efficient and portable fuel cell not dependent upon gravity for operation which converts thermal energy from any convenient source into electrical energy.

There is at present a great need for a battery capable of directly converting thermal energy, particularly natural thermal energy such as that from the sun, into electrical energy. It is known that the world supply of nuclear fuels and fossil fuels such as petroleum, coal and natural gas is limited and will eventually be depleted. Furthermore, there is an ever increasing demand for power in remote places of the earth such as desert and arctic regions where the cost of delivery of conventional fuels is high. There is also a need for a small economical battery capable of producing electrical energy at remote sites in smaller amounts than are obtainable from conventional power plants.

It has been proposed to use so-called fuel cells to regenerate electrical energy by electro-chemical means to supply power in such remote sites. However, all such systems normally present fundamental disadvantages associated with the supply and preparation of fuels and removal of end products. I have now discovered a novel battery by the use of which the above needs can be satisfied and which does not possess the disadvantages attendant upon the use of other fuel cells proposed heretofore. Furthermore, in one embodiment of my invention the battery functions in the absence of gravity and thus is particularly suitable for use in satellites or other space vehicles where gravity is substantially absent and where celestial sources of thermal energy are available for regeneration of the battery.

The battery of the present invention employs as an anode depolarizer an element from Groups II and III of Period II, including beryllium and boron; Groups III and IV of Period III, including silicon and aluminum; Groups III through VII of Series 1 of Period IV including titanium, manganese, scandium, vanadium and chromium; Groups I through V of Series 2 of Period IV, including copper, zinc, gallium, germanium and arsenic; Groups III through VI of Series 1, of Period V including molybdenum, yttrium, zirconium and columbium; Groups I through V of Series 2 of Period V, including silver, tin, cadmium, antimony, indium; Groups IV through VI of Series 1 of Period VI including hafnium, tungsten and tantalum; Groups I through V of Series 2 of Period VI including mercury, bismuth, gold, thallium and lead; or any transition element including iron, rhodium, platinum, cobalt, nickel, ruthenium, palladium, osmium and iridium. I have found the preferred element for my purpose to be bismuth.

The use of the free metal as the anode depolarizer aids in achieving a higher degree of battery efficiency. This increased efficiency results from the fact that the valence change of the metal during operation of the battery is directly related to the amount of electric energy produced per unit weight of metal undergoing the valence change. The valence change of the metal is maximized by starting with the metal in its lowest valence state; i.e., the free metal which has a valence of zero.

Any halogen other than fluorine and selected from the group consisting of iodine, chlorine and bromine is suitable as a cathode depolarizer for the battery of this invention. The preferred halogen is iodine.

The metal salts formed within the battery by reaction between the above-mentioned anode and cathode depolarizers preferably are thermally decomposable at a temperature below about 1000° C. It is also preferred that the metal salt be such that the free metal and free halogen formed at its thermal decomposition temperature are in different physical states, e.g., the metal formed is in the solid state while the halogen is liquid or gas; or if the metal is liquid the halogen is in a gaseous state. This difference in state makes for ease of separation of the elements. The use of the above-mentioned halogens as cathode depolarizers gives many functional advantages in the battery. Specifically, it has been found that these halogens are readily condensable; thus, the halogen formed by decomposition of the metal halide in the hot region of the battery condenses in the cold, cathode region. This condensation creates a partial vacuum adjacent the cathode which causes additional halogen gas to flow to the cathode. This results in a steady convection current within the battery, and aids greatly in its performance. The convection currents created by the condensing halogen eliminates the need for the use of high gas pressures within the battery, and thereby reduces the danger of gas leakage through the battery housing. Further, the condensation provides the needed circulation within the battery without great temperature differentials. The condensable halogen depolarizers are also advantageous in that the condensation reduces the total gas volume within the battery, and thus permits of a smaller and lighter weight battery.

As will be explained below, the presence of an electrolyte is not always necessary for the operation of a fuel cell according to the method of this invention but for most purposes a suitable electrolyte which is a mixture of metal halides is preferably employed.

Briefly, my novel battery functions as follows. The halogen cathode depolarizer is ionized at the cathode, after which it migrates to the anode. At the anode, the free metal anode depolarizer becomes ionized and combines with the cathode depolarizer to form a compound which is unstable at higher temperatures. The ionizations taking place at the anode and cathode create a difference in potential between these two electrodes as in any conventional galvanic battery. The battery is kept in continual operation, or regenerated, as the case might be, by supplying heat to the compound formed from the ionized anode and cathode depolarizers in sufficient quantity to cause it to decompose into its nonionized moieties. The anode and cathode depolarizers thus regenerated then repeat the above-described cycle of ionization at their respective electrodes and recombination to form the thermally unstable compound, which is again decomposed by heat to its substituents, etc. It will be apparent to those skilled in the art that the novel battery of this invention can be operated continuously by supplying a constant source of heat, and thus continuously decomposing the thermally unstable compound shortly after its formation, or cyclically by separately storing the anode and cathode depolarizers generated during periods of heating for use during those periods when no heat is supplied to the system.

The novel thermally regenerative battery of this invention will be better understood from the following description and the accompanying drawings, of which.

Figure 1:
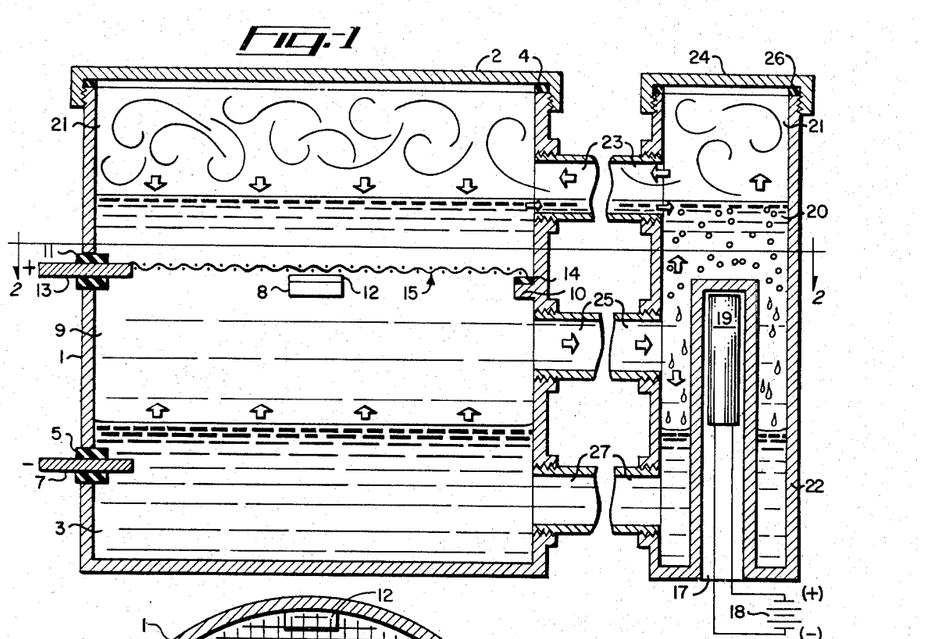
FIGURE 1 is a longitudinal section of an illustrative embodiment of my novel battery in operation, taken on the line 1—1 of FIGURE 2.
Figure 2:
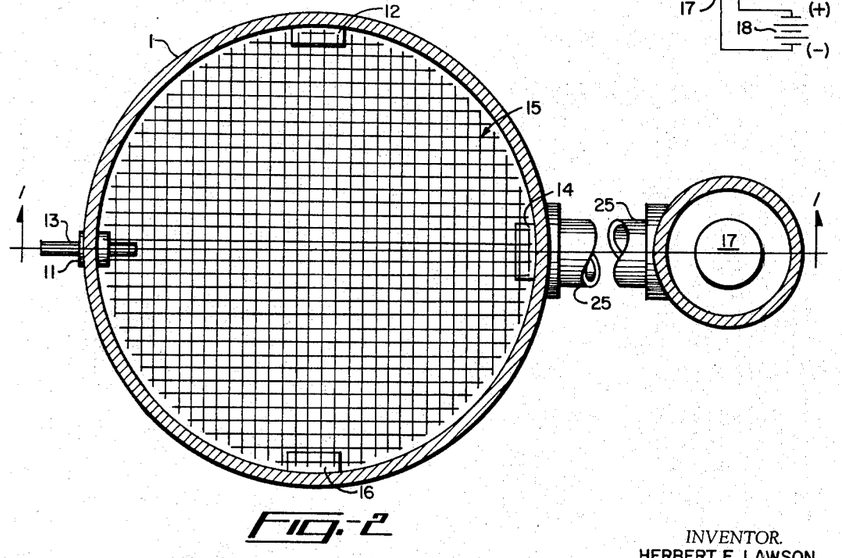
FIGURE 2 is a sectional view of the battery taken on the line 2—2 of FIGURE 1.

Referring first to FIGURES 1 and 2, there is shown a cylindrical housing 1, having a screw-on top closure 2. When top closure 2 is tightened, the housing is hermetically sealed by means of gasket 4. Housing 1 and top closure 2 are made of a suitable metal or other material capable of withstanding the elevated temperatures to which the battery contents are subjected and substantially unreactive with the reactants, products, and electrolyte constituents of the battery such as, for example, stainless steel. Gasket 4 is also made from a suitable material capable of withstanding battery temperatures and substantially inert to the battery contents such as, for example, asbestos. In the bottom portion of housing 1 there is confined a pool of molten bismuth metal 3. Other suitable metals can be substituted for the bismuth, as long as the other elements of the battery function properly in conjunction therewith. For example, if metal having a relatively high melting point, such as nickel, is employed in place of the bismuth, the battery housing must be made of a material capable of containing the molten metal and the hot electrolyte, an example of such a material being ceramic alumina.

Projecting through the wall of housing 1, and insulated therefrom by insulator 5, into molten bismuth 3, is anode electrode 7. Lying on top of molten bismuth 3 in housing 1 is a liquid body of a suitable electrolyte 9. The electrolyte is a fused mixture of halides, such as a mixture of zinc, lithium, and potassium chlorides or a mixture of cadmium and potassium chlorides. Projecting through housing 1, and insulated therefrom by insulator 11, into electrolyte 9 is cathode electrode 13. Directly joined to cathode electrode 13 is cathode 15. Cathode 15 is a screen of some suitably inert metal, such as tantalum. Other suitable materials from which the cathode can be made are tungsten, platinum, carbon, and the like. Cathode screen 15 is supported in a horizontal position by means of lugs, such as those shown at 8 and 10, having insulating layers, such as those shown at 12, 14 and 16 respectively, on their upper faces. The supporting lugs for the cathode are contiguous with and project outwardly from the inner wall of housing 1 as shown.

In communication with housing 1 by means of open pipes 23, 25, and 27 is another housing 22 having a screw-on top closure 24 and a gasket 26 similar to the closure and gasket for housing 1 and a well 17 as shown. As in the case of housing 1, pipes 23, 25, and 27; housing 22; closure 24; and gasket 26 are made of suitable materials capable of withstanding the temperatures of battery operation and substantially inert to the battery contents. Pipes 23, 25, and 27 connect ports in housing 1 with respective ports in housing 22, the pipes being screwed at each end into threads in the port holes as shown. The screw connections are made tight enough to hermetically seal the contents of the battery from the outer surroundings. Positioned in well 17, in housing 22 as shown, is heating element 19. Heating element 19 is an electrical resistance unit connected to a power source 18, as shown, but it can also be any other suitable and readily available means for supplying heat energy. The heat itself can be any waste heat or can be supplied directly by the burning of conventional fuels or indirectly therefrom by means of a heat exchanger; from the focusing of the sun's rays; or from a thermonuclear device.

In the space above electrolyte 9, in battery housing 1, gaseous iodine 21 is provided as a cathode depolarizer. When the battery is in operation, the temperatures and pressures within housing 1 are normally such that the iodine depolarizer is present in gaseous form. However, iodine is a solid under standard conditions of temperature and pressure and thus it can easily be stored as such during periods while the battery is inactive.

When the battery of FIGURES 1 and 2 is in operation, the pool of bismuth metal 3 is maintained at a temperature of at least 271° C. which is the melting point of bismuth. If necessary, external heat can be supplied to the bismuth by means well-known to those skilled in the art, such as controlled electrical heating elements, not shown. Electrolyte 9 is a mixture of halides, such as zinc and potassium chlorides, having a melting point of from about 150° C. to about 250° C. There is normally sufficient heat added to the battery by heating element 19, when it is in operation, to maintain the electrolyte in a molten condition. However, if such is not the case, sufficient additional heat to accomplish this can easily be added to the system by any conventional means.

Gaseous iodine 21 dissolves in the electrolyte, in housing 1, to form compounds such as KI (and/or counterpart compounds from cations other than potassium ions in the electrolyte) and in so doing acts as a cathode depolarizer by accepting electrons from cathode 15. The ionized iodine from the KI, or the like, migrates to the pool of molten bismuth 3 and reacts with the metal to form $BiI_3$. To react with the iodine ions, the bismuth must become positively charged, and to do this it gives up electrons to anode 7. Thus, a potential difference is set up between electrodes 7 and 13 rendering the battery capable of delivering electrical current.

The $BiI_3$ dissolves in the electrolyte and the resulting mixture flows through channel 25 into housing 22 (the hot section of the battery) wherein it is heated to about 500° C. by means of heating element 19. At this temperature the $BiI_3$ decomposes, iodine boiling off and bubbling upward as shown at 20 in FIGURE 1, and metallic bismuth settling to the bottom of the cell as shown. The regenerated electrolyte floats to the top where it returns to housing 1 (the cool section) through channel 23 as indicated by the arrow on the drawing. The iodine vapor also returns to housing 1 through channel 23. The battery will operate continuously as long as heat is supplied, but is may also be operated intermittently if desired. The battery functions largely by means of convection currents and hence is dependent upon gravity for successful operation.

Figure 3:
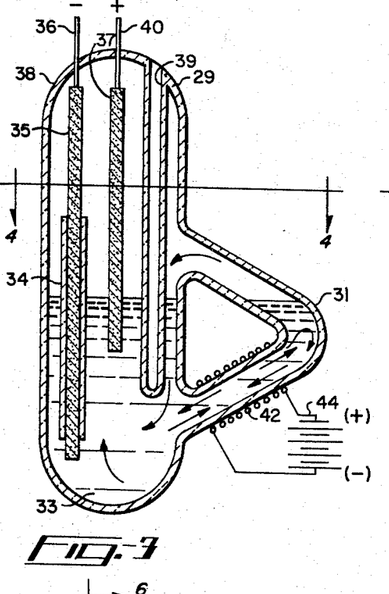
FIGURE 3 is a longitudinal section of a laboratory working model of a fuel cell according to this invention, taken on line 3—3 of FIGURE 4.
Figure 4:
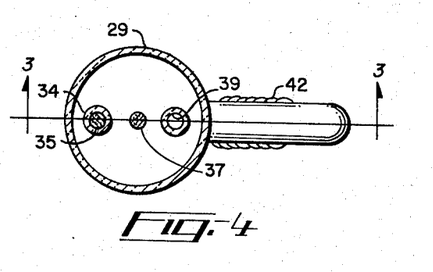
FIGURE 4 is a sectional view of the cell taken on line 4—4 of FIGURE 3.

Turning next to FIGURES 3 and 4, these drawings show another embodiment of my novel battery in operation in which there is no reservoir of molten bismuth metal as shown in FIGURE 1. FIGURE 3 shows a glass Thiele melting point tube 29, with a sealed end closure 38, filled to part way up side-arm 31 with molten electrolyte 33. Electrolyte 33 is a mixture of zinc, potassium, lithium, and sodium chlorides having a specific gravity of 2.9 and a melting point of 150° C. Anode electrode 35 is a carbon rod immersed in electrolyte 33 to such a depth that its lower tip is opposite the lower opening of side-arm 31. Anode electrode 35 is fastened to and suspended by tungsten wire 36 which is sealed in end closure 38 as shown. Most of that portion of anode 35 which is immersed in electrolyte 33 is encased in glass as indicated on the drawing at 34.

A porous carbon rod 37 is suspended from tungsten wire 40 which is sealed in end closure 38 in the same fashion as tungsten wire 36. Carbon rod 37 dips only shallowly into electrolyte 33 and serves as a cathode for the battery. A glass thermocouple well 39, in contiguity with end closure 38, is positioned in Thiele tube 29, as shown, with its closed lower end dipping into electrolyte 33. A thermocouple is placed in thermocouple well 39 for purposes of measuring and controlling temperatures during operation of the battery. An electric heating element 42, connected to a power source 44, encircles the lower section of side-arm 31 as shown. Heating element 42 furnishes the necessary heat for operating the battery.

The presence of a small amount of $BiI_3$ in electrolyte 33 enables the apparatus to function as a battery. To activate the battery, heat is applied by means of heating coil 42 until the temperature of the wall of the lower section of side-arm 31 is around 600° C. and that of the electrolyte at the electrodes is about 250° C. A suitable insulating material such as asbestos (not shown) can be wrapped around heating coil 42 and the lower section of side-arm 31 to prevent excessive heat losses from the system if desired. When sufficient heat has been added to the battery system, a rapid circulation of electrolyte by convection in the direction shown by the arrows takes place. The $BiI_3$ circulates through side-arm 31 as a result of the convection currents in the cell and is decomposed by the heat in the lower section thereof into iodine and bismuth metal.

The gaseous iodine formed as a result of the decomposition of the $BiI_3$ flows through the upper portion of the side-arm to cathode 37 where is becomes ionized. The bismuth from the decomposition of the $BiI_3$ appears in the form of a colloidal mist in the electrolyte, and it circulates back to the main body of electrolyte in Thiele tube 29 (as indicated by the arrows on the drawing) where it comes in contact with anode 35 and is ionized. The ionized bismuth and iodine react to form $BiI_3$, which is transported by convection into side-arm 31, decomposed therein, etc. The iodine and bismuth ionizations taking place at cathode 37 and anode 35, respectively, create a potential difference between these two electrodes and are the source of current from the battery.

Figure 5:
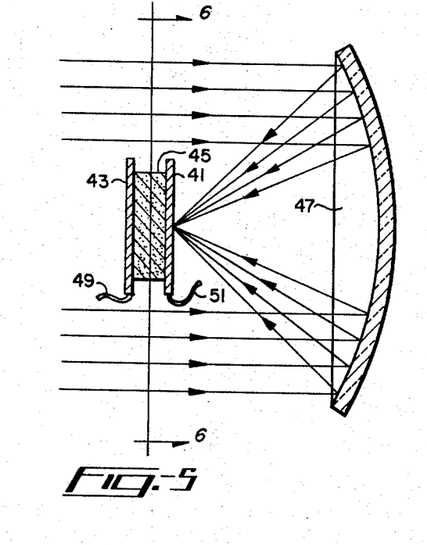
FIGURE 5 shows a sectional view of a fuel cell according to this invention which operates in the absence of gravity and a concave mirror in position for focusing solar rays on the cell, taken on line 5—5 of FIGURE 6.
Figure 6:
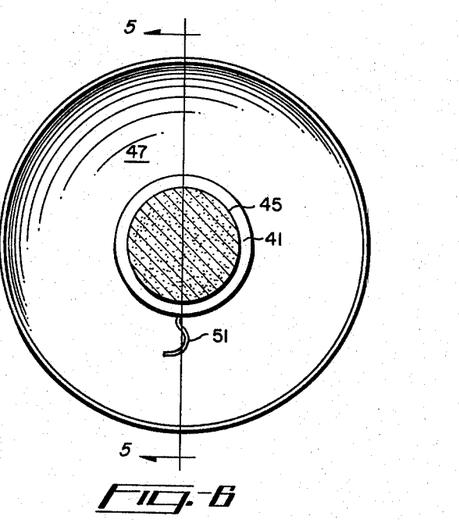
FIGURE 6 shows a sectional view of the fuel cell and mirror taken on line 6—6 of FIGURE 5.

Turning now to FIGURES 5 and 6, there is shown a simple sandwich-type cell according to my invention which will function in the complete absence of gravity. The cell comprises a disk 45 fashioned of a porous ceramic material which may or may not be impregnated with an electrolyte. Where an electrolyte is present, it can be a mixture of halides such as that of the FIGURE 3 battery. Disk 45 can be made of a suitably nonconductive porous material other than a ceramic, such as asbestos, if desired. Where disk 45 is of ceramic construction, its peripheral edge is preferably glazed to seal in any electrolyte present. Impregnated in porous disk 45 is a small amount of $BiI_3$.

In laminar relationship with porous disk 45, and positioned one on each side thereof as shown, are two relatively thin layers 41 and 43 of a conductive material such as gold. Gold elements 41 and 43 serve as electrodes and they have leads 49 and 51 attached thereto as shown. Electrodes 41 and 43 can be made of any conductive material, substantially nonreactive with the various components of the battery system, known to those skilled in the art as suitable for electrode use. For example, electrodes 41 and 43 can be of tungsten, platinum, carbon, or tantalum construction.

The heat source for the cell of FIGURES 5 and 6 is the sun, the rays of which are captured and concentrated on electrode 41 by concave mirror 47 as shown. In operation, electrode 41 of this cell is heated while electrode 43 is exposed to the air for a cooling effect. Thus, when the cell is functioning, it has a hot electrode and a relatively cool one, and a voltmeter connected to leads 49 and 51 registers the voltage differential between these two elements. The hot electrode is always the anode and the "cool" electrode the cathode. The cell functions better when there is an electrolyte present in porous disk 45 but, as indicated above, a voltage difference between electrodes 41 and 43 is produced even in the complete absence of such an electrolyte.

Briefly, the operation of the cell can be explained as follows. The $BiI_3$ is decomposed at hot electrode 41, yielding metallic bismuth and iodine. The bismuth remains at electrode 41 where it is ionized, while the iodine travels to the "cool" electrode 43 as a gas where it then condenses and becomes ionized. The iodine ions diffuse toward hot electrode 41 and supply electrons to the bismuth ions, thus yielding $BiI_3$ which decomposes to start the ionization and reaction cycle over again. Classically, the mechanism of battery operation can be described as one in which $BiI_3$ is formed to generate current, after which it diffuses from the areas of high concentration to those of low concentration and decomposes at the hot electrode. When $BiI_3$ is decomposed at the hot electrode, the concentration of the salt is lowered in that vicinity so that more $BiI_3$ diffuses in that direction.

The cell has substantially unlimited shelf life when cold and inert, and it will deliver current as long as heat is supplied to one electrode and removed from the other one. The cell can be started and stopped an unlimited number of times.

Figure 7:
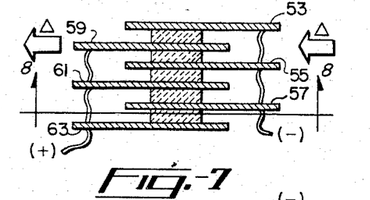
FIGURE 7 shows a sectional view of a battery of fuel cells according to my invention in parallel circuit arrangement, taken on line 7—7 of FIGURE 8.
Figure 8:
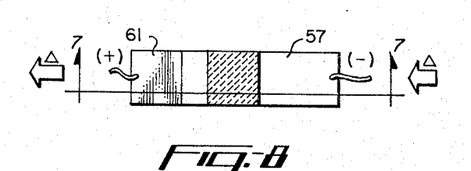
FIGURE 8 shows a sectional view of the battery taken on line 8—8 of FIGURE 7.

In FIGURES 7 and 8 a battery of cells of the type shown in FIGURES 5 and 6 are depicted in parallel arrangement. Heat is added to anodes 53, 55, and 57 and, at the same time, heat is permitted to escape from cathodes 59, 61, and 63, thus making these electrodes "cool." The voltage of this battery is the same as that of any one cell, but the current is equal to the sum of the individual cell currents.

Figure 9:
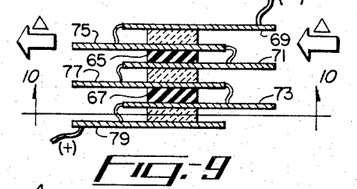
FIGURE 9 is a sectional view of a battery of fuel cells according to my invention in series circuit arrangement, taken on line 9—9 of FIGURE 10.
Figure 10:
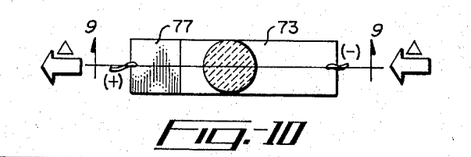
FIGURE 10 shows a sectional view of the battery taken on line 10—10 of FIGURE 9.

FIGURES 9 and 10 depict three cells of the FIGURE 5 type in a series circuit, separated from each other by insulating elements 65 and 67. As is obvious from the drawing, heat is supplied to cell anodes 69, 71, and 73 and permitted to escape from cell cathodes 75, 77, and 79. The battery electrodes are cell anodes 69 and cell cathode 79. The voltage of the battery is equivalent to the sum of the individual cell voltages.

Following are descriptions of the assembly and operation of various batteries within the scope of my invention. It is to be clearly understood that these examples are for illustrative purposes only and that my invention is not limited to the embodiments and arrangements described therein.

Example I

A common Thiele melting point tube was filled to halfway up the side-arm with about 40 grams of molten electrolyte. The electrolyte was a mixture of zinc, potassium, lithium, and sodium chlorides having a specific gravity of 2.9, a melting point of 150° C., and a boiling point of 730+° C. Two carbon electrodes were placed in the open tube: a smooth, glass-insulated one with an exposed tip opposite the bottom of the side-arm and a porous one with one end dipping into the electrolyte. A closed-end glass tube containing a thermocouple was inserted in the electrolyte for temperature measurement and control. The whole assembly was held together and supported by conventional laboratory clamps and a ring stand, using electrical insulation where necessary.

A voltmeter was connected to the electrodes. Heat was applied to the lower section of the side-arm by a gas burner and later by an electric heating coil and a rapid circulation of the electrolyte by convection was immediately observable. About half a gram of dry $BiI_3$ was dropped in the open Thiele tube. The $BiI_3$ immediately started to dissolve, forming a pale yellow solution. In about one minute the meter showed a voltage. Soon an equilibrium was reached at 0.26 volt and about 0.1 milliampere load with the wall of the side tube at about 600° C. and the electrolyte at the electrodes at 250° C.

The flow of electrolyte up and down the lower part of the side-arm, the flow of iodine gas through the upper section of the side-arm to the upper electrode, and the constant circulation of the main body of the electrolyte were apparent. The voltage was found to vary at different temperatures in different parts of the cell, but otherwise it was constant and reproducible. Values over 0.4 volt were recorded. A similar cell was operated continuously for 293 hours. There was no indication that the cell could not have been operated indefinitely, particularly if the top had been closed to prevent the escape of iodine from the tube.

*Example II*

A simple galvanic cell comprising a test tube containing a layer of fused salt electrolyte over a pool of molten bismuth was set up. The electrolyte consisted of a mixture of the chloride salts of Example I. Contact with the bismuth was made by means of a tungsten wire sealed in glass. The cathode consisting of a tungsten wire was immersed in the top of the electrolyte layer. Solid iodine was added to the cell at the cathode surface. The temperature was measured with a thermocouple in a glass tube placed in the electrolyte at the surface of the bismuth. The whole cell was placed in a bath of molten low melting alloy heated with a bunsen burner; the temperature was controlled manually.

Figure 11:
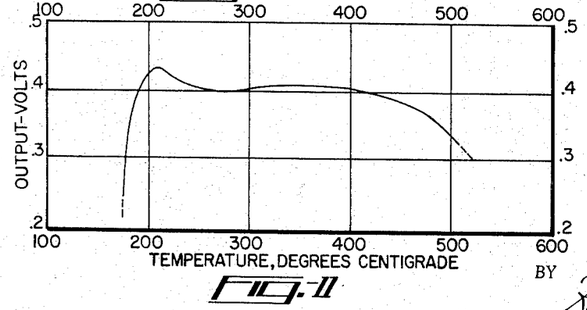

The voltage between the electrodes was measured under varying conditions of electrolyte temperature and load. FIGURE 11 of the accompanying drawings shows the voltage delivered by the cell on a load of about 0.3 milliampere per square inch of electrode surface at various temperatures throughout the operating temperature range. The precipitous drop in voltage at approximately 175° C. was due to solidification of the electrolyte.

*Example III*

To demonstrate continuous operation, two cells were made, each of which consisted of two spherical sections connected by a constricted tube. The spherical sections were blown from Pyrex glass and carried small side-arms for filling and to allow for changes in volume of the contents with changes in temperature. The electrodes were two identical porous carbon cubes measuring 5 x 5 x 5 mm., mounted on tungsten wires. These were sealed in opposite sides of one of the bulbs. The cells were filled with a mixture of LiCl, KCl, NaCl, and $ZnCl_2$, containing a small amount of $BiI_3$, then evacuated and sealed. They were oriented horizontally with one electrode above the other.

The bulbs which did not contain the electrodes were heated by means of a bunsen burner and within minutes the upper electrode became positive and the lower electrode became negative. The amount of free iodine present in the operating walls was so small as to be barely visible. The free bismuth metal was not observable.

Cell No. 1 delivered 0.26 volt on a load of 3000 ohms and 0.15 volt on 33 ohms. Cell No. 2 ran for 7 consecutive days delivering up to 0.1 volt on 3000 ohms. The voltage difference between these two cells was a function of the operating temperature. Cell No. 2 was operated at a lower temperature than was No. 1 in an effort to prolong its life. Both of these cells failed because of the softening of the Pyrex glass containers.

*Example IV*

A W-shaped glass tube was formed and filled with an electrolyte-$BiI_3$ mixture similar to that of Example III. A pool of bismuth was placed in one "leg" and contact was made with a tungsten wire. A carbon electrode was placed in the other "leg" and an excess of iodine was added. Electrolyte filled the space between the electrodes. The electrodes were then maintained at different temperatures by means of two burners and the temperatures were measured by two thermocouples.

Figure 12:
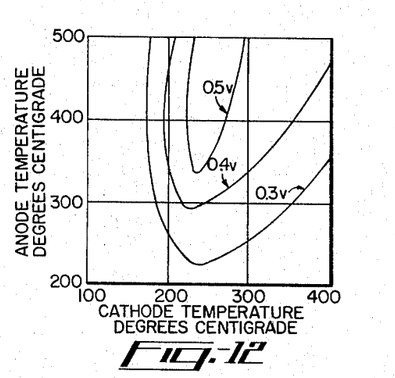

Voltage measurements were made with the two electrodes at different temperatures and the results plotted. The approximate contour lines of equal voltage are shown in FIGURE 12 of the accompanying drawings.

*Example V*

The following describes the construction and operation of a simple cell according to my invention which is capable of functioning in the absence of gravity.

Two identical graphite blocks with inserted tungsten leads were separated by a layer of asbestos sheet. The asbestos was saturated with electrolyte of the type employed in Example I (a mixture of zinc, potassium, lithium, and sodium chlorides) containing a small amount of $BiI_3$. The assembly was oriented such that one block was below the other and the asbestos was horizontal. When a burner was held under the lower block, the upper block being cooled by air, a voltage of 0.3 volt was obtained at a current density of 15 milliamperes per square inch. The upper electrode was positive.

The voltage could be varied by changing the temperature of either block. When the flame was removed the voltage dropped to zero and as soon as it was reapplied the voltage again appeared. When the flame was played on the upper block and the lower block was cooled the voltage dropped to zero, then reversed, the lower electrode becoming positive, and again a voltage of 0.3 was obtained at a current density of 15 milliamperes per square inch. These changes were repeated, each reversal requiring about one minute.

*Example VI*

The following is a description of the assembly and operation of a cell according to my invention in which germanium and iodine were employed as anode and cathode depolarizers, respectively.

The apparatus and method of Example I were duplicated, except that the temperature was adjusted to 413° C. and germanium, instead of bismuth, was employed as the anode depolarizer.

Figure 13:
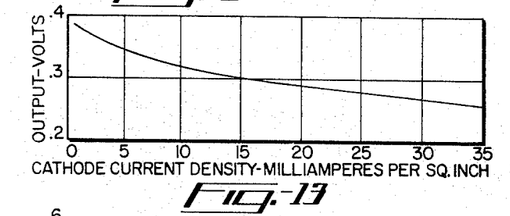

FIGURE 13 of the drawings shows a plot of the voltage obtained from the germanium-iodine cell versus the cathode current density.

*Example VII*

A procedure and apparatus similar to those of Example VI were used except that the temperature of the cell was adjusted to 430° C. and silicon was used in place of germanium as the anode depolarizer to produce electrical current.

Figure 14:
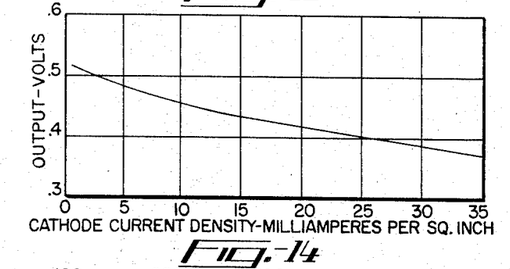

FIGURE 14 shows a voltage versus cathode current density plot for this example.

Example VIII

A procedure and apparatus similar to those of Example VI were again used except that mercury was used as the anode depolarizer to produce electrical current. The cell produced voltages similar to those of the Example VI cell.

Example IX

A cell capable of operating in the absence of gravity somewhat similar to that described in Example V was also built and tested. The cell consisted of two thin gold sheets separated by a porous ceramic disk about 1/16 inch thick and about 1/2 inch in diameter. The ceramic disk was saturated with an electrolyte comprising a mixture of zinc, potassium, lithium, and sodium chlorides having a specific gravity of 2.9, a melting point of 150° C., and a boiling point of 730+° C. The gold electrodes were connected by leads to a voltmeter.

One of the gold electrodes was heated by solar rays concentrated by means of a concave mirror. The voltmeter registered a voltage as a result of the solar heating.

Example X

The procedure described in Example IX was duplicated except that no electrolyte was used. It was again found that the application of solar heat to one of the gold electrodes produced a difference in electrical potential between the electrodes.

As explained above, the preferred materials for use as anode and cathode depolarizers in the novel battery of my invention are bismuth and iodine, respectively. The primary reasons for this are the conveniently low melting point of bismuth and the "reasonable" decomposition temperature of $BiI_3$. It should be emphasized, however, that many elements in addition to bismuth and any halogen other than fluorine can be employed as depolarizers for purposes of this invention. Fluorine is unsatisfactory for use in my battery because of the extremely high thermal stability of its salts which would require operating temperatures above those usable with conventional metals.

Alloys of metals can be employed as anode depolarizers within the scope of this invention and, by the same token, mixtures of halogens can also be used. The use of alloys might be desirable in certain instances for one reason or another. For example, it might be desirable to employ a low melting alloy of bismuth, such as Wood's alloy (65.5° C.), as an anode depolarizer because of the temperature and heat saving advantages to be gained thereby.

Table I, below, lists a number of chemical systems suitable for use in my novel battery, this table being included here for purposes of illustrating the great number and variety of anode-cathode depolarizer combinations within the scope of my invention. I have measured the voltages of cells embodying many of the above-mentioned systems, in the laboratory, and the data thus obtained are included in Table I. It is emphasized that Table I is intended for illustrative purposes only and that it is not to be construed as limitative of the scope of the present invention.

TABLE I

| Thermally Unstable Compound | Decomposition Temperature (° C.) | Measured Voltage |
|---|---|---|
| $AlCl_3$ | 1,000 | (*) |
| $AlBr_3$ | 1,000 | 1.15 |
| $AlI_3$ | 1,000 | .66 |
| $AuCl$ | 300 | (*) |
| $AuBr$ | 270 | .38 |
| $AuI$ | 200 | .40 |
| $AgI$ | 1,000 | .80 |
| $BBr_3$ | 700 | .70 |
| $BeI_2$ | 700 | (*) |
| $CdI_2$ | 1,175 | .80 |
| $CoI_2$ | 540 | (*) |
| $CrI_2$ | 900 | (*) |
| $CuI$ | 900 | .77 |
| $FeI_2$ | 1,100 | .74 |
| $GeCl_2$ | 450 | (*) |
| $GeBr_2$ | 450 | .80 |
| $GeI_2$ | 240 | .75 |
| $HfI_4$ | 1,600 | (*) |
| $HgCl_2$ | 460 | (*) |
| $HgBr_2$ | 440 | (*) |
| $HgI_2$ | 320 | .90 |
| $NiI_2$ | 900 | .25 |
| $PdI_2$ | 350 | .45 |
| $PtCl_2$ | 580 | (*) |
| $PtBr_2$ | 410 | .47 |
| $PtI_2$ | 330 | .30 |
| $SiI_4$ | 770 | .95 |
| $ThI_4$ | 490 | (*) |
| $TiI_4$ | 1,200 | .50 |
| $UI_4$ | 1,060 | (*) |
| $VI_2$ | 1,000 | (*) |
| $ZrI_4$ | 1,200 | .66 |

*Not measured.

It is within the scope of my invention to employ a suitable decomposition catalyst, such as platinum or nickel oxide, in the system where desired. It is also within the scope of the invention to treat the electrodes, or other elements of the battery, in special ways to improve performances so long as the fundamental reaction system of this invention is not materially altered thereby.

The temperatures of operation of my novel battery are, of course, dependent upon the melting points and decomposition temperatures of the various substances involved in the particular system under consideration.

It should be clear from the above description that the battery of this invention depends on the existence of both a relatively hot region and a relatively cool region for successful operation and that in every embodiment of the invention the cathode is positioned in the cool region. The anode, on the other hand, can be positioned in either the cool region or the hot region, depending on the particular embodiment of the battery under consideration.

I claim:

1. A self-contained thermally activated galvanic battery comprising in combination:
   a closed container means adapted to have, when the battery is in operation, a relatively hot region and a relatively cool region;
   a cathode positioned in the relatively cool region;
   an anode positioned within the container means away from the cathode;
   a supply of material within the closed container selected from the group consisting of the salts
      of an element selected from the group consisting of the elements of Groups II and III of Period II, the elements of Groups III and IV of Period III, the elements of Groups III through VII of Series 1 of Period IV, the elements of Groups I through V of Series 2 of Period IV, the elements of Groups III through VI of Series 1 of Period V, the elements of Groups I through V of Series 2 of Period V, the elements of Groups IV through VI of Series 1 of Period VI, the elements of Groups I through V of Series 2 of Period VI, of the periodic table, and the transition elements selected from Group VIII of the periodic table;
      and a halogen having an atomic weight in excess of 19 and selected from the group consisting of chlorine, bromine and iodine, and mixtures of said salts, in the relatively hot region of the battery, which material is thermally decomposable at the temperatures obtaining therein during the operation of said battery, wherein said material is thermally decomposed into its constituents in elemental form;
   means within the closed container for permitting circulation of the elemental constituents of the material to the vicinity of the anode and cathode, respectively, whereby they become ionized and recombine to form the material thermally decomposable in the relatively hot region of the battery;
   and means within the closed container for permitting circulation of the thermally decomposable material to said hot region from the region in which it is formed.

2. The thermally activated galvanic battery of claim 1 wherein the thermally decomposable material has a decomposition temperature below about 1000° C.

3. A thermally activated galvanic battery comprising in combination:
   a layer of porous, electrically nonconductive, thermally stable material having dispersed therein a material selected from the group consisting of the salts
      of an element selected from the group consisting of the elements of Groups II and III of Period II, the elements of Groups III and IV of Period III, the elements of Groups III through VII of Series 1 of Period IV, the elements of Groups I through V of Series 2 of Period IV, the elements of Groups III through VI of Series 1 of Period V, the elements of Groups I through V of Series 2 of Period V, the elements of Groups IV through VI of Series 1 of Period VI, the elements of Groups I through V of Series 2 of Period VI, of the periodic table, and the transition elements selected from Group VIII of the periodic table,
      and a halogen having an atomic weight in excess of 19, and selected from the group consisting of chlorine, bromine and iodine, and mixtures of said salts;
   two layers of an electrically conductive, thermally stable material separated from each other by the nonconductive material and each in contact with a different elemental product of the thermal decomposition of the said salt material, the elemental products constituting the anode and cathode depolarizers, respectively;
   and means for heating one of the layers of electrically conductive material to a temperature sufficiently high to decompose the said salt material into its elemental constituents.

4. A method of generating electrical energy from thermal energy comprising:
   in a first step reacting ions selected from the group consisting of the ions of the elements selected from the group consisting of the elements of Groups II and III of Period II, the elements of Groups III and IV of Period III, the elements of Groups III through VII of Series 1 of Period IV, the elements of Groups I through V of Series 2 of Period IV, the elements of Groups III through VI of Series 1 of Period V, the elements of Groups I through V of Series 2 of Period V, the elements of Groups IV through VI of Series 1 of Period VI, the elements of Groups I through V of Series 2 of Period VI, of the periodic table, and the transition elements selected from Group VIII of the periodic table;
   with ions of halogens having an atomic weight in excess of 19, and selected from the group consisting of chlorine, bromine and iodine, to form a material which is unstable at a substantially higher temperature than that at which it is formed;
   disposing the material in a medium within which said material can dissociate and its elemental constituents can migrate therethrough, said medium being in contact with an anode and a cathode;
   in a second step heating the material to decompose it into its elemental constituents:
   in a third step causing the elemental constituents to contact the anode and the cathode, respectively, whereby they are ionized, thereby causing an excess of electrons to accumulate at the anode, a paucity of electrons at the cathode, and a difference in potential to exist between the anode and the cathode; and
   continuously recycling the ionized products of the third step to the first step.

5. A method of generating electrical energy from thermal energy comprising:
   in a first step reacting ions selected from the group consisting of the ions of the elements selected from the group consisting of the elements of Groups II and III of Period II, the elements of Groups III and IV of Period III, the elements of Groups II through VII of Series 1 of Period IV, the elements of Groups I through V of Series 2 of Period IV, the elements of Groups III through VI of Series 1 of Period V, the elements of Groups I through V of Series 2 of Period V, the elements of Groups IV through VI of Series 1 of Period VI, the elements of Groups I through V of Series 2 of Period VI, of the periodic table, and the transition elements selected from Group VIII of the periodic table;
   with ions of halogens having an atomic weight in excess of 19, and selected from the group consisting of chlorine, bromine, and iodine, to form a material which is unstable at a substantially higher temperature than that at which it is formed;
   disposing the material in a medium within which said material can dissociate and its elemental constituents can migrate therethrough, said medium being in contact with an anode and a cathode;
   in a second step heating the material to decompose it into its elemental constituents;
   in a third step causing the elemental constituents to contact the anode and cathode, respectively, whereby they are ionized, thereby causing an excess of electrons to accumulate at the anode, a paucity of electrons at the cathode, and a difference in potential to exist between the anode and the cathode; and
   continuously recycling the ionized products of the third step to the first step.

6. A self-contained thermally activated galvanic battery comprising in combination:
   closed container means adapted to have, when the battery is in operation, a relatively hot region and a relatively cool region;
   a cathode positioned in the relatively cool region;
   an anode positioned within the container means away from the cathode;
   a supply of a salt within the closed container means of an element from Series 2, Groups I through V, of Period VI, of the periodic table, and iodine, in the relatively hot region of the battery, which salt is thermally decomposable at the temperatures obtaining therein during operation of said battery, whereby said salt is thermally decomposed into its constituents in elemental form;
   means within the closed container for permitting circulation of the elemental constituents of the salt to the vicinity of the anode and cathode, respectively, whereby they become ionized and recombine to form the salt thermally decomposable in the relatively hot region of the battery;
   and means within the closed container for permitting circulation of the thermally decomposable salt to said hot region from the region in which it is formed.

7. A self-contained thermally activated galvanic battery comprising in combination:
   closed container means adapted to have, when the battery is in operation, a relatively hot region and a relatively cool region;
   a cathode positioned in the relatively cool region;
   an anode positioned within the container means away from the cathode;
   a supply of a salt within the closed container of an element of Series 2, Groups I through V, of Period IV, of the periodic table, and chlorine, in the relatively hot region of the battery, which salt is thermally decomposable at the temperatures obtaining therein during operation of said battery, whereby said salt is thermally decomposed into its constituents in elemental form;

means within the closed container means for permitting circulation of the elemental constituents of the salt to the vicinity of the anode and the cathode, respectively, whereby they become ionized and recombine to form the salt thermally decomposable in the relatively hot region of the battery;

and means within the closed container for permitting circulation of the thermally decomposable salt to said hot region from the region in which it is formed.

8. A self-contained thermally activated galvanic battery comprising in combination:

closed container means adapted to have, when the battery is in operation, a relatively hot region and a relatively cool region;

a cathode positioned in the relatively cool region;

an anode positioned within the container means away from the cathode;

a supply of a salt within the closed container of an element of Period III, Groups III and IV, of the periodic table, and bromine, in the relatively hot region of the battery, which salt is thermally decomposable at the temperatures obtaining therein during operation of said battery, whereby said salt is thermally decomposed into its constituents in elemental form;

means within the container means for permitting circulation of the elemental constituents of the salt to the vicinity of the anode and the cathode, respectively, whereby they become ionized and recombine to form the salt thermally decomposable in the relatively hot region of the battery; and means within the container means for permitting circulation of the thermally decomposable salt to said hot region from the region in which it is formed.

9. A self-contained thermally activated galvanic battery comprising in combination:

a closed container means adapted to have, when the battery is in operation, a region sufficiently hot to decompose $BiI_3$ and a relatively cool region;

a cathode positioned in the relatively cool region;

an anode positioned within the container means away from the cathode;

a supply of $BiI_3$ within the closed container means in the relatively hot region of the battery, whereby it is thermally decomposed into bismuth metal and gaseous iodine; means for permitting circulation of the bismuth metal and the gaseous iodine to the vicinity of the anode and cathode, respectively, whereby they become ionized and recombine to form $BiI_3$;

and means within the container means for permitting circulation of the $BiI_3$ to said hot region from the region in which it is formed.

10. A self-contained thermally activated galvanic battery comprising in combination:

a closed battery housing adapted to have, when the battery is in operation, a region sufficiently hot to decompose $BiI_3$ and a relatively cool region;

an electrolyte confined within said battery housing;

a cathode positioned within the electrolyte in the relatively cool region;

an anode positioned away from the cathode within the electrolyte in the relatively cool region;

a supply of $BiI_3$ within the closed battery housing in the hot region of the battery, whereby it is thermally decomposed into metallic bismuth and gaseous iodine;

means within the closed battery housing for permitting circulation of the bismuth metal and the iodine to the vicinity of the anode and cathode, respectively, whereby they become ionized and recombine to form $BiI_3$; and means for permitting circulation of the $BiI_3$ to said hot region from the region in which it is formed.

11. The thermally activated galvanic battery of claim 10 in which the means for permitting circulation of the $BiI_3$ from the relatively cool region to the hot region of the battery and the metallic bismuth formed in the hot region to the anode comprises convection currents set up in the electrolyte by virtue of the two temperature zones created and maintained therein when the battery is in operation.

12. A thermally activated galvanic battery comprising in combination:

a layer of porous, electrically nonconductive, thermally stable material having dispersed therein a salt of an element from Series 2, Groups I through V, of Period VI, of the periodic table, and iodine;

two layers of an electrically conductive material separated from each other by the nonconductive material having the salt dispersed therein and each in contact therewith;

and means for heating one of the layers of conductive material.

13. A thermally activated galvanic battery comprising in combination:

a porous ceramic material impregnated with an electrolyte containing $BiI_3$;

two layers of an electrically conductive material separated from each other by the impregnated ceramic material and each in contact therewith;

and means for heating one of the layers of electrically conductive material.

14. A method of generating electrical energy from thermal energy comprising:

in a first step reacting ions of an element from Series 2, Groups I through V, of Period VI, of the periodic table, with iodine ions to form a compound which is unstable at a higher temperature than that at which it is formed;

disposing the compound in a medium within which said compound can dissociate and its constituents migrate therethrough, said medium being in contact with an anode and cathode;

in a second step heating the compound to decompose it into an element of Series 2, Groups I through V, of Period VI of the periodic table, and gaseous iodine;

in a third step causing said element from Period VI of the periodic table to contact the anode and the iodine to contact the cathode, whereby each is ionized, thereby, causing an excess of electrons to accumulate at the anode, a paucity of electrons at the cathode, and a difference in potential to exist between the anode and the cathode; and continuously recycling the ionized products of the third step to the first step.

15. A method of generating electrical energy from thermal energy comprising:

in a first step reacting ions of an element from Series 2, Groups I through V, of Period IV, of the periodic table, and chlorine, to form a compound which is unstable at a higher temperature than that at which it is formed;

disposing the compound in a medium within which said compound can dissociate and its elemental constituents can migrate therethrough, said medium being in contact with an anode and cathode;

in a second step heating the compound to decompose it into an element of Series 2, Groups I through V, of Period IV, of the periodic table, and gaseous chlorine;

in a third step causing said element from Period IV of the periodic table to contact the anode and the chlorine to contact the cathode, whereby each is ionized, thereby, causing an excess of electrons to accumulate at the anode, a paucity of electrons at the cathode, and a difference in potential to exist between the anode and the cathode; and continuously recycling the ionized products of the third step to the first step.

16. A method of generating electrical energy from thermal energy comprising: reacting bismuth ions with iodine ions to form $BiI_3$; disposing the $BiI_3$ in a medium within which its elemental constituents can dissociate and can migrate therethrough, said medium being in contact with an anode and cathode; heating the $BiI_3$ to decompose it into metallic bismuth and gaseous iodine whereby causing the bismuth to migrate the anode and the iodine to the cathode, whereby each is ionized, causing an excess of electrons to accumulate at the anode, a paucity of electrons at the cathode, and a difference of potential to exist between the anode and the cathode; and continuously recycling each of the products of the above operations to the next operation in sequence to assure a continuous output of electrical energy without the addition of any new material to the system.

17. A method of generating electrical energy from thermal energy comprising:
reacting bismuth ions with iodine ions to form $BiI_3$;
disposing the $BiI_3$ in a medium within which it can dissociate and its elemental constituents can migrate therethrough, said medium being in contact with an anode and a cathode;
heating the $BiI_3$ to decompose it into metallic bismuth and gaseous iodine thereby
causing the bismuth to contact the anode and the iodine to contact the cathode, whereby each is ionized, and
causing an excess of electrons to accumulate at the anode, a paucity of electrons at the cathode, and a difference of potential to exist between the anode and the cathode.

18. A method of generating electrical energy from thermal energy comprising:
maintaining a body of liquid electrolyte, with an anode and a cathode separately positioned and partially immersed therein, under confinement;
introducing iodine into the electrolyte wherein it becomes ionized by accepting electrons from the cathode;
maintaining bismuth metal in the electrolyte, whereby it becomes ionized by donating electrons to the anode and then reacts with the ionized iodine to form $BiI_3$;
creating convection currents in the electrolyte by localized heating thereof at a temperature sufficient to decompose the $BiI_3$ into metallic bismuth and gaseous iodine, which currents convey said $BiI_3$ into the heated zone wherein it is decomposed, and then convey the metallic bismuth formed therein back to the area of the anode where it is again ionized to react with ionized iodine;
and effecting recirculation of the gaseous iodine from said heated zone back to the cathode where it becomes ionized again to react with ionized bismuth.

19. The method of claim 18 wherein the electrolyte comprises a mixture of metal halides melting at a temperature below the decomposition temperature of $BiI_3$.

20. The method of generating electrical energy from thermal energy comprising:
reacting ions of an element from Series 2, Groups I through V, of Period VI, of the periodic table, with iodine ions to form a compound which is unstable at a higher temperature than that at which it is formed;
disposing the compound in a medium within which said compound can dissociate and its elemental constituents can migrate therethrough, said medium being in contact with an anode and cathode;
heating the compound to decompose it into an element of Series 2, Groups I through V, of Period VI, of the periodic table, and gaseous iodine thereby
causing said element from Period VI of the periodic table to contact the anode and the iodine to contact the cathode, whereby each is ionized,
causing an excess of electrons to accumulate at the anode, a paucity of electrons at the cathode, and a difference in potential to exist between the anode and the cathode;
and continuously recycling each of the products of the above operation to the next operation in sequence to assure a continuous output of electrical energy without the addition of any new material to the system.

References Cited
UNITED STATES PATENTS

| | | | |
|---|---|---|---|
| 2,921,110 | 1/1960 | Crowley et al. | 136—86 |
| 3,031,518 | 4/1962 | Werner et al. | 136—86 |

ALLEN B. CURTIS, *Primary Examiner.*

WINSTON A. DOUGLAS, *Examiner.*